US012566252B1

(12) United States Patent
Li et al.

(10) Patent No.:  US 12,566,252 B1
(45) Date of Patent:       Mar. 3, 2026

(54) HYBRID SOLID-STATE LIDAR WITH INCREASED SIGNAL DYNAMIC RANGE AND CONTROL METHOD

(71) Applicant: PHOTONAI TECHNOLOGY INC, San Ramon, CA (US)

(72) Inventors: Kun Li, San Ramon, CA (US); Zexiong Chen, San Ramon, CA (US); Fengjie Zhang, San Ramon, CA (US)

(73) Assignee: PHOTONAI TECHNOLOGY INC, San Ramon, CA (US)

( * ) Notice: Subject to any disclaimer, the term of this patent is extended or adjusted under 35 U.S.C. 154(b) by 0 days.

(21) Appl. No.: 19/095,116

(22) Filed: Mar. 31, 2025

(51) Int. Cl.
| | |
|---|---|
| *G01C 3/08* | (2006.01) |
| *G01S 7/481* | (2006.01) |
| *G01S 7/4865* | (2020.01) |
| *G01S 17/10* | (2020.01) |

(52) U.S. Cl.
CPC .......... *G01S 7/4815* (2013.01); *G01S 7/4816* (2013.01); *G01S 7/4817* (2013.01); *G01S 7/4865* (2013.01); *G01S 17/10* (2013.01)

(58) Field of Classification Search
CPC .... G01S 7/4815; G01S 7/4816; G01S 7/4817; G01S 7/4865; G01S 17/10
See application file for complete search history.

(56) References Cited

U.S. PATENT DOCUMENTS

2020/0284883 A1*    9/2020   Ferreira ................ G01S 7/4815

* cited by examiner

*Primary Examiner* — Samantha K Nickerson

(57) ABSTRACT

The present disclosure provides a hybrid solid-state lidar with an increased signal dynamic range and a control method. The hybrid solid-state lidar includes: a laser transmitter unit, a laser receiver unit, a transmitting mirror, a receiving mirror, and a rotating polygon mirror, where the laser transmitter unit includes multiple power-and-pulse-width-adjustable vertical cavity surface emitting lasers (VCSELs); the laser receiver unit adopts a single photon avalanche diodes (SPADs) array sensor; and the laser transmitter unit performs at least one emission cycle during a single measurement. By dynamically adjusting emission parameters within a single ranging cycle, the present disclosure expands the signal dynamic range in a time coherent single photon counting (TCSPC) process, enhancing measurement precision of the lidar in both long-and short-range ranging.

8 Claims, 9 Drawing Sheets

S10

A laser transmitter unit performs at least one emission cycle during a single measurement, where within each emission cycle, each of M power-and-pulse-width-adjustable VCSELs emits Y detection laser beams; the laser transmitter unit includes N power-and-pulse-width-adjustable VCSELs, where N>1, M≤N, M is a positive integer, and Y≥3; a total number of VCSELs emitting detection laser beams across cumulative emission cycles is equal to N; and among the Y detection laser beams emitted within each emission cycle, at least one detection laser beam is emitted with parameters selected from a low-power short-pulse-width range, at least one detection laser beam is emitted with parameters selected from a high-power short-pulse-width range, and at least one detection laser beam is emitted with parameters selected from a high-power long-pulse-width range

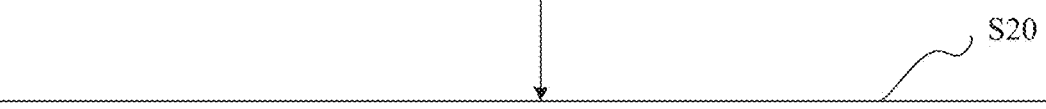

S20

The detection laser beams are reflected by a transmitting mirror to a rotating polygon mirror, and the rotating polygon mirror reflects the detection laser beams to form detection scanning beams.

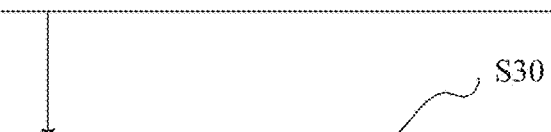

S30

The rotating polygon mirror receives echo signals generated when the detection scanning beams scan an object, and reflects the echo signals to a receiving mirror; and the receiving mirror reflects the echo signals to a laser receiver unit, thereby completing a single measurement

FIG. 9

HYBRID SOLID-STATE LIDAR WITH INCREASED SIGNAL DYNAMIC RANGE AND CONTROL METHOD

TECHNICAL FIELD

The present disclosure relates to a technical field of lidars, and in particular to a hybrid solid-state lidar with an increased signal dynamic range and a control method.

BACKGROUND

As a core sensor for high-precision three-dimensional (3D) environmental perception, lidar is widely used in autonomous driving, robotic navigation, and surveying, etc. Its core technology relies on precise measurement of the time-of-flight (ToF) of laser pulses, which calculates the time difference between emission and reception to obtain target distance information. Current mainstream solutions employ the pulse ranging method, which involves emitting short laser pulses (with pulse widths ranging from several nanoseconds to tens of nanoseconds and peak powers ranging from tens of watts to several kilowatts). These pulses are collimated via a transmitting optical system to illuminate the target, and the reflected signals are focused onto a photodetector via a receiving optical system, with the photodetector completing echo acquisition. However, in achieving high-precision ranging from meter to kilometer scales, the lidar system must satisfy the requirements for both high detection sensitivity and wide dynamic range, which imposes formidable challenges on the design of receiving circuitry.

Currently, lidar receiving systems primarily utilize three types of photodetectors: avalanche photo diodes (APDs), silicon photomultipliers (SiPMs), and single photon avalanche diodes (SPADs). Although APDs demonstrate linear response characteristics, their constrained sensitivity proves inadequate to satisfy the demand for long-range weak signal detection. While SiPMs demonstrate single-photon-level sensitivity, their analog output necessitates the integration of a high-speed analog-to-digital converter (ADC) and a time-to-digital converter (TDC) for signal processing, thereby imposing significant system complexity. SPADs demonstrate single-photon detection capability, and their digital pulse output allows direct timestamp processing, making them suitable for high-resolution array designs. However, the inherent dynamic range limitation of SPADs leads to photon count saturation when measuring short-range targets such as road signs or vehicles, resulting in reflectivity distortion in short-range measurements.

SUMMARY

To solve the above-mentioned technical problems, the present disclosure provides a hybrid solid-state lidar with an increased signal dynamic range and a control method. The present disclosure can solve the problem of reflectivity signal loss encountered by an existing SPADs-based lidar in short-range ranging, and increase the signal dynamic range during a single measurement, thereby enhancing the measurement precision of the lidar.

In a first aspect, the present disclosure provides a hybrid solid-state lidar with an increased signal dynamic range, including:

a laser transmitter unit, a laser receiver unit, a transmitting mirror, a receiving mirror, and a rotating polygon mirror, where the laser transmitter unit includes N power-and-pulse-width-adjustable vertical cavity surface emitting lasers (VCSELs), and the laser receiver unit adopts a single photon avalanche diodes (SPADs) array sensor;

the laser transmitter unit and the transmitting mirror are arranged at one side of the rotating polygon mirror and form a laser outgoing optical path structure with the rotating polygon mirror;

the laser receiver unit and the receiving mirror are also arranged at the one side of the rotating polygon mirror; and the laser receiver unit, the receiving mirror, and the rotating polygon mirror form a laser incoming optical path structure;

the laser transmitter unit performs at least one emission cycle during a single measurement;

within each emission cycle, each of M power-and-pulse-width-adjustable VCSELs emits Y detection laser beams, where N>1, M≤N, M is a positive integer, and Y≥3; and a total number of VCSELs emitting detection laser beams across cumulative emission cycles is equal to N; and among the Y detection laser beams emitted within each emission cycle, at least one detection laser beam is emitted with parameters selected from a low-power short-pulse-width range, at least one detection laser beam is emitted with parameters selected from a high-power short-pulse-width range, and at least one detection laser beam is emitted with parameters selected from a high-power long-pulse-width range.

Furthermore, the N VCSELs are arranged in a vertical linear array.

Furthermore, the rotating polygon mirror includes multiple reflective surfaces arranged in equal divisions around a circumcircle defined by a cross-section of the rotating polygon mirror.

Furthermore, a value of the N is determined based on a preset number of lines of the lidar and a pixel count covered by the VCSELs.

Furthermore, M≤N/2.

Furthermore, a value of the Y is determined by solving a lidar equation for a preset lidar detection condition.

Furthermore, a transmitting focusing and collimating unit is disposed between the laser transmitter unit and the transmitting mirror; and a receiving focusing and collimating unit and a filter unit are sequentially disposed between the laser receiver unit and the receiving mirror.

According to a second aspect, the present disclosure provides a control method for a hybrid solid-state lidar with an increased signal dynamic range, including:

performing, by a laser transmitter unit, at least one emission cycle during a single measurement, where within each emission cycle, each of M power-and-pulse-width-adjustable VCSELs emits Y detection laser beams; the laser transmitter unit includes N power-and-pulse-width-adjustable VCSELs, where N>1, M≤N, M is a positive integer, and Y≥3; a total number of VCSELs emitting detection laser beams across cumulative emission cycles is equal to N; and among the Y detection laser beams emitted within each emission cycle, at least one detection laser beam is emitted with parameters selected from a low-power short-pulse-width range, at least one detection laser beam is emitted with parameters selected from a high-power short-pulse-width range, and at least one detection laser beam is emitted with parameters selected from a high-power long-pulse-width range;

reflecting, by a transmitting mirror, the detection laser beams to a rotating polygon mirror; and reflecting, by the rotating polygon mirror, the detection laser beams to form detection scanning beams; and receiving, by the rotating polygon mirror, echo signals generated when the detection scanning beams scan an object; reflecting the echo signals to a receiving mirror; and reflecting, by the receiving mirror, the echo signals to a laser receiver unit, thereby completing a single measurement.

Furthermore, the control method further includes:

determining a measurement sequence type of the single measurement, where the measurement sequence type includes an initial measurement and a non-initial measurement;

in response to that the measurement sequence type is determined as the initial measurement, among the Y detection laser beams emitted within each emission cycle, at least one detection laser beam is emitted with parameters selected from the low-power short-pulse-width range, at least one detection laser beam is emitted with parameters selected from the high-power short-pulse-width range, and at least one detection laser beam is emitted with parameters selected from the high-power long-pulse-width range; and in response to that the measurement sequence type is determined as the non-initial measurement, the parameters for the Y detection laser beams emitted within each emission cycle are determined based on a preset tiered gain; the tiered gain defines a correspondence between emission parameters of a VCSEL and a ranging distance; and the ranging distance is calculated by the laser receiver unit based on echo signals from an initial measurement.

The present disclosure provides a hybrid solid-state lidar with an increased signal dynamic range and a control method. By dynamically adjusting the emission parameters within a single ranging cycle, the present disclosure expands the signal dynamic range during a time coherent single photon counting (TCSPC) process. The present disclosure suppresses short-range saturation while improving long-range sensitivity, without increasing hardware complexity or accumulation cycles. The present disclosure solves the short-range reflectivity signal loss problem caused by fixed parameters in conventional SPADs-based hybrid solid-state lidars. Thus, the hybrid solid-state lidar of the present disclosure maintains high accuracy for both long-and short-range ranging, offering a novel technical approach for reliable perception in complex scenarios.

BRIEF DESCRIPTION OF THE DRAWINGS

FIG. 9 is a schematic flowchart of a control method for a hybrid solid-state lidar according to an embodiment of the present disclosure.

DETAILED DESCRIPTION

In order to make the objectives, technical solutions, and advantages of the embodiments of the present disclosure clearer, the technical solutions in the embodiments of the present disclosure will be clearly and completely described below in conjunction with the drawings in the embodiments of the present disclosure. Apparently, the described embodiments are some, rather than all of the embodiments of the present disclosure. All other embodiments obtained by a person of ordinary skill in the art based on the embodiments of the present disclosure without creative efforts shall fall within the protection scope of the present disclosure.

Figure 1:
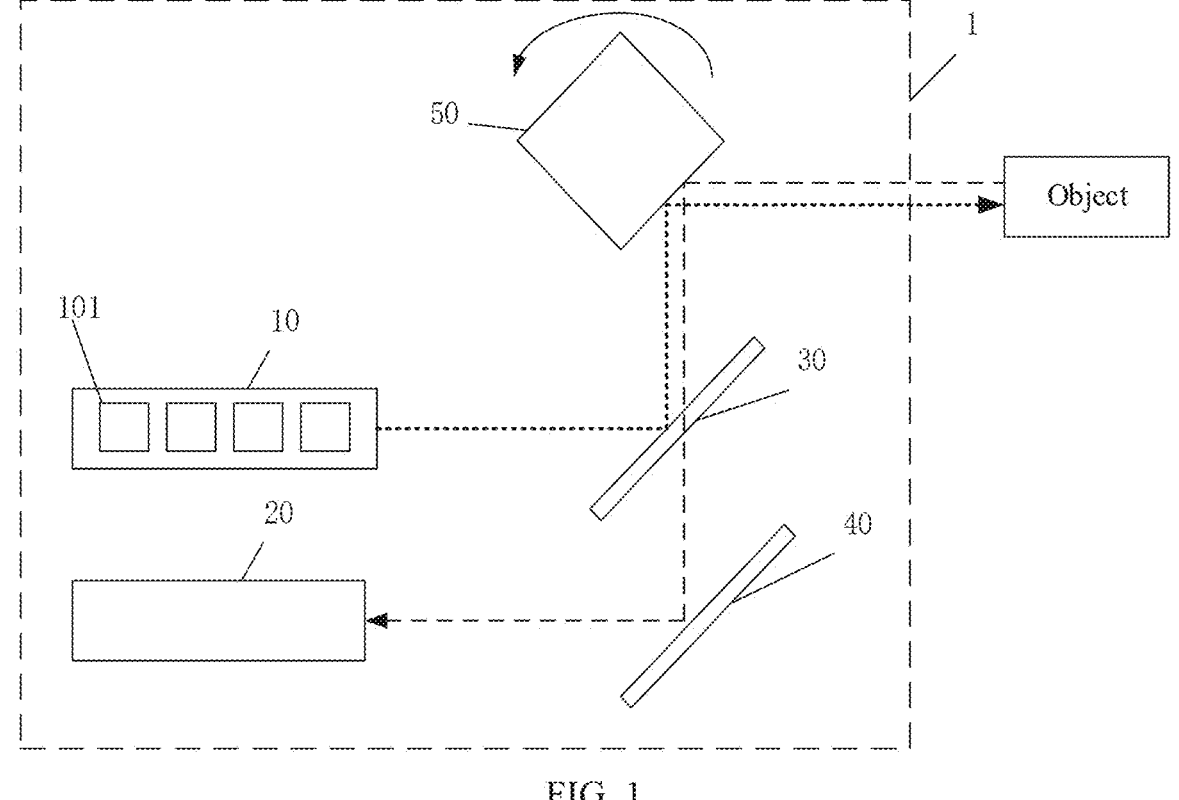
FIG. 1 is a structural schematic diagram of a hybrid solid-state lidar with an increased signal dynamic range according to an embodiment of the present disclosure.

Referring to FIG. 1, a first embodiment of the present disclosure provides a hybrid solid-state lidar with an increased signal dynamic range. A hybrid solid-state lidar 1 includes a laser transmitter unit 10, a laser receiver unit 20, a transmitting mirror 30, a receiving mirror 40, and a rotating polygon mirror 50.

The hybrid solid-state lidar 1 of this embodiment adopts conventional lidar architecture. The laser transmitter unit 10 and the transmitting mirror 30 are arranged at one side of the rotating polygon mirror 50. The laser transmitter unit 10, the transmitting mirror 30, and the rotating polygon mirror 50 collectively form a laser outgoing optical path structure. Under the laser outgoing optical path structure, a detection laser beam emitted by the laser transmitter unit 10 is reflected to the rotating polygon mirror 50 via the transmitting mirror 30, and forms a detection scanning beam via rotational reflection of the rotating polygon mirror 50.

The laser receiver unit 20 and the receiving mirror 40 are also arranged at the one side of the rotating polygon mirror 50. The laser receiver unit 20, the receiving mirror 40, and the rotating polygon mirror 50 collectively form a laser incoming optical path structure. Under the laser incoming optical path structure, an echo signal generated when the detection scanning beam encounters an object is reflected to the rotating polygon mirror 50, further reflected to the receiving mirror 40 via the rotating polygon mirror 50, and finally reflected to the laser receiver unit 20 via the receiving mirror 40.

In this embodiment, the rotating polygon mirror 50 is driven by a motor to rotate about a central axis. Reflective surfaces of the rotating polygon mirror are arranged in equal divisions around a circumcircle defined by a cross-section of the rotating polygon mirror. The detection laser beam is reflected to different directions via rotation, achieving scanning coverage. The laser transmitter unit 10 and the laser receiver unit 20 are disposed at the same side of the rotating polygon mirror 50, and physical isolation or multiplexing of transmitting and receiving optical paths is achieved via optical design. This design enables compact lidar architecture that reduces overall dimensions, suiting for factoryinstalled integration while minimizing mechanical complexity and improving reliability. Spatial positions of the laser transmitter unit 10, the laser receiver unit 20, and the rotating polygon mirror 50 are not specifically limited. The laser transmitter unit 10 and the laser receiver unit 20 may be arranged on a same horizontal plane as the rotating polygon mirror 50 or on a different horizontal plane.

Figure 2:
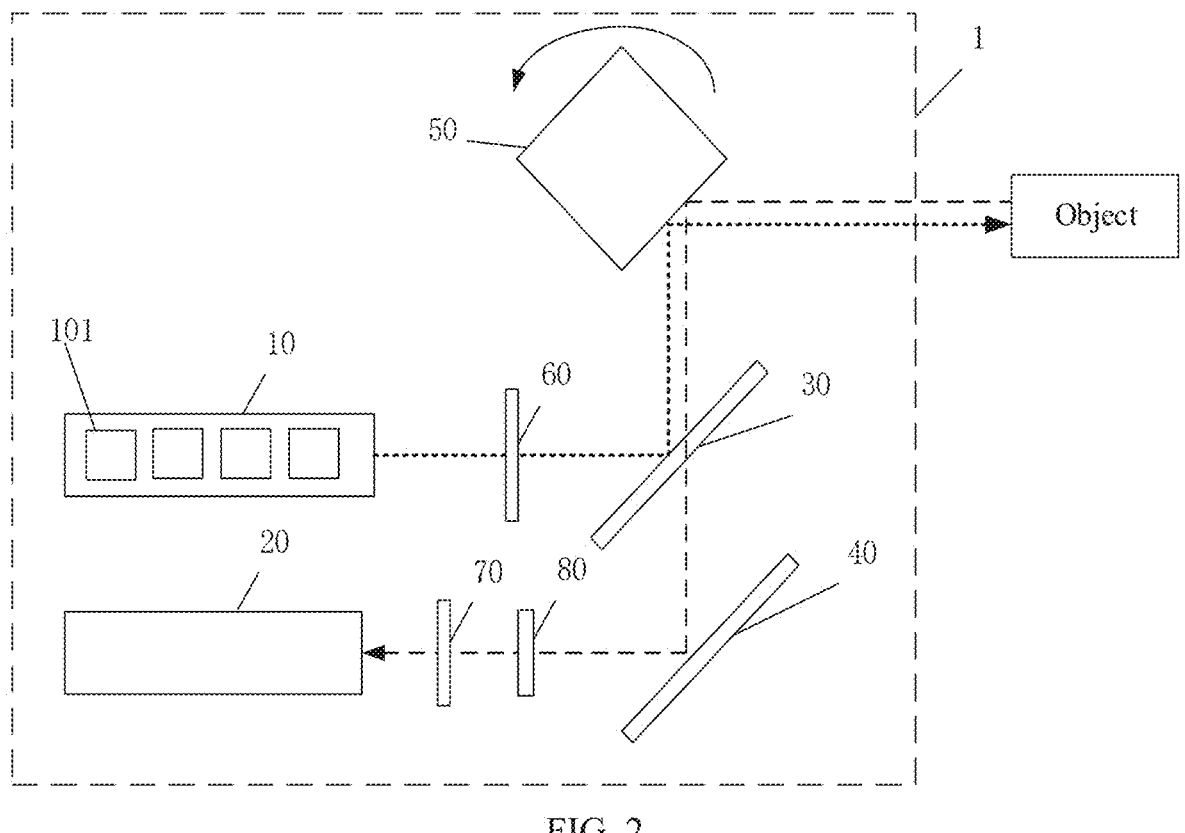
FIG. 2 is another structural schematic diagram of the hybrid solid-state lidar with an increased signal dynamic range according to an embodiment of the present disclosure.

When the laser transmitter unit 10 and the laser receiver unit 20 are arranged on the same horizontal plane as the rotating polygon mirror 50, referring to FIG. 2, a transmitting focusing and collimating unit 60 is disposed between the laser transmitter unit 10 and the transmitting mirror 30. A receiving focusing and collimating unit 70 and a filter unit 80 are sequentially disposed between the laser receiver unit 20 and the receiving mirror 40. Optionally, the transmitting focusing and collimating unit 60 and the receiving focusing and collimating unit 70 each include one or more focusing and collimating lenses. The filter unit 80 includes one or more optical filters. The detection laser beam emitted by the laser transmitter unit 10 is incident on the transmitting mirror 30 via the transmitting focusing and collimating unit 60. It is reflected to the rotating polygon mirror 50 via the transmitting mirror 30, and finally reflected via rotation of the rotating polygon mirror 50 for scanning. When the detection scanning beam scans the object, an echo signal is generated via diffuse reflection and propagates back along the optical path to the rotating polygon mirror 50. The rotating polygon mirror 50 reflects the echo signal to the transmitting mirror 30. To achieve optical path multiplexing, the transmitting mirror 30 uses a polarizing beam splitter to transmit the echo signal to the receiving mirror 40. The receiving mirror 40 reflects the echo signal, and the echo signal is received by the laser receiver unit 20 after passing through the filter unit 80 and the receiving focusing and collimating unit 70.

When the laser transmitter unit 10 and the laser receiver unit 20 are not arranged on the same horizontal plane as the rotating polygon mirror 50, the transmitting mirror 30 and the receiving mirror 40 may adopt different lens groups to adjust the optical paths of the detection laser beam and the echo signal, respectively. In this way, the detection laser beam can achieve target scanning detection via a transmitting lens group and the rotating polygon mirror 50, and the echo signal can return to the laser receiver unit 20 via the rotating polygon mirror 50 and a receiving lens group. The lidar structure may refer to a conventional lidar structure with lens groups, which will not be redundantly described herein.

In this embodiment, the laser transmitter unit 10 includes N vertical cavity surface emitting lasers (VCSELs) 101, where N is greater than 1. The N VCSELs 101 are arranged in a vertical linear array to form an emitter array. The laser receiver unit 20 adopts a single photon avalanche diodes (SPADs) array sensor.

A conventional SPADs-based hybrid solid-state lidar requires multiple measurements for a single ranging of the object. The SPADs employ a time coherent single photon counting (TCSPC) method to store and timestamp the photon count from each measurement, thereby achieving high-precision ranging. The number of measurements ranges from several to thousands, depending on application scenarios. When detecting a photon, the SPADs will determine the detection timestamp of the photon. Each recorded event (photon) increments a corresponding storage unit by 1. The address of the storage unit corresponds to the detection timestamp. After accumulating numerous photons, the distribution of detection timestamps, i.e., the waveform of the optical pulses, is obtained from photon counts in each storage unit. The time of flight (ToF) is estimated based on the peak point of the waveform, and a single ranging of the lidar is achieved by multiplying the ToF by the speed of light.

To obtain a more stable echo signal and improve measurement accuracy, a conventional SPADs-based hybrid solid-state lidar adopts fixed power and pulse width for each measurement. Specifically, during a single measurement, each VCSEL in the laser transmitter unit emits the detection laser beam once, and the detection laser beam emitted in each measurement has fixed frequency and pulse width. This single-parameter emission mode has the following limitations. When multiple VCSELs emit simultaneously with a fixed high power, the short-range echo photon count exceeds the capacity of the SPADs units, thereby resulting in loss of reflectivity information. Reducing the emission power can mitigate the loss of reflectivity information but will further decrease the long-range signal photon count and require more accumulation cycles, thereby degrading the response speed of the lidar system. Consequently, this single-parameter emission mode fails to simultaneously satisfy the requirement for high dynamic range in short-range applications and the requirement for high sensitivity in long-range applications. This limitation constrains the adaptability of SPADs-based hybrid solid-state lidars in complex scenarios, such as urban road environments with mixed-reflectivity targets including lane markings, vehicles, and road signs.

Figure 3:
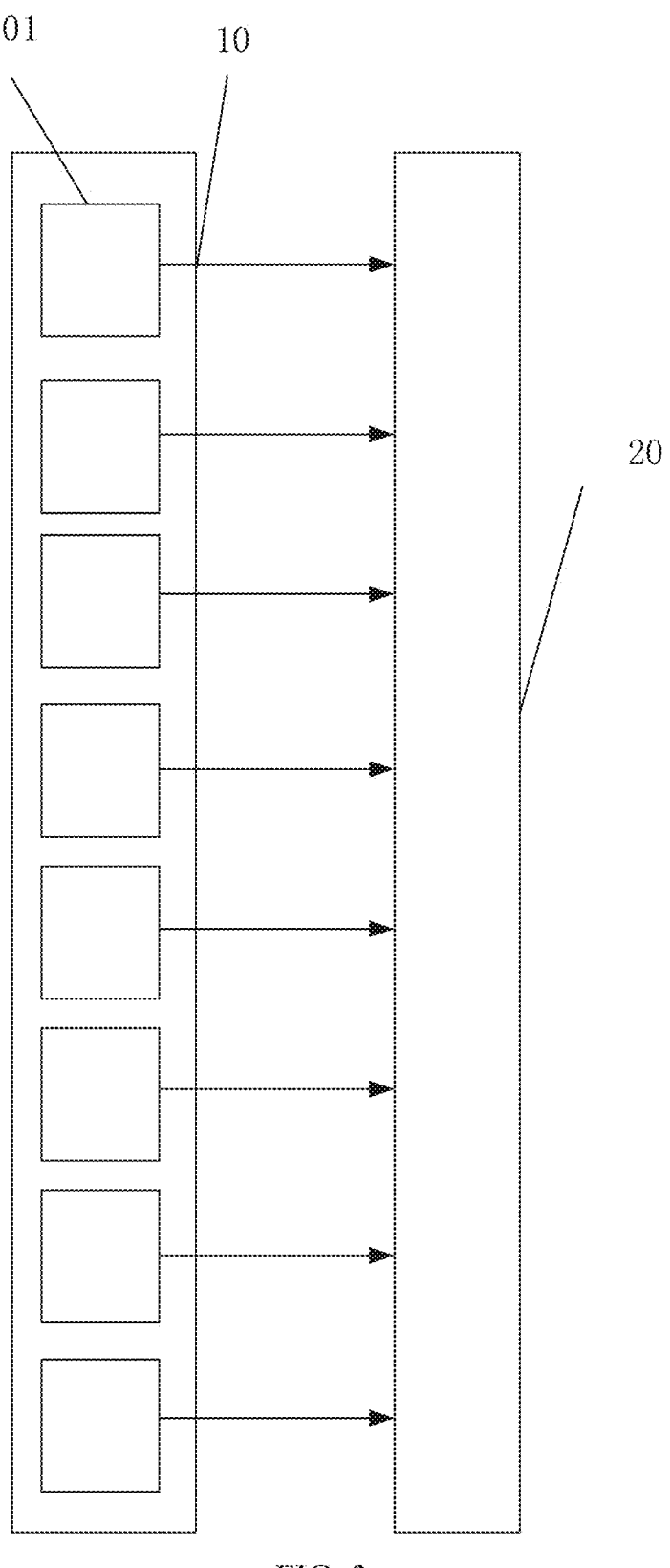
FIG. 3 is a schematic diagram of field of view (FoV) tiling for multiple emitting lasers according to an embodiment of the present disclosure.

To solve the above-mentioned problems, the hybrid solid-state lidar 1 of this embodiment adopts multiple power-and-pulse-width-adjustable VCSELs 101 as the laser transmitter unit 10, based on the conventional SPADs-based lidar architecture. The pixel count of the SPADs determines the lines of the lidar. Under specified dimensions, the pixel count covered by each VCSEL 101 is fixed. Therefore, the quantity of VCSELs 101 in the laser transmitter unit 10 can be determined based on the line requirement of the lidar. For example, to achieve a 256-channel lidar, the SPADs need to cover 256 pixels. If each VCSEL 101 covers 32 pixels, 8 VCSELs 101 are required for transmitting field of view (FoV) tiling, as shown in FIG. 3. The aspect ratio of the VCSELs will affect their yield. Moreover, as each VCSEL illuminates multiple pixels during the emission process, excessive dimensions of VCSELs will induce intractable crosstalk. Consequently, reducing the dimensions of the VCSELs and increasing the quantity of the VCSELs can mitigate crosstalk generation. In this embodiment, preferably, VCSELs with an aspect ratio not exceeding 5:1 are selected and arranged in a vertical linear array to form the laser transmitter unit 10.

Figure 4:
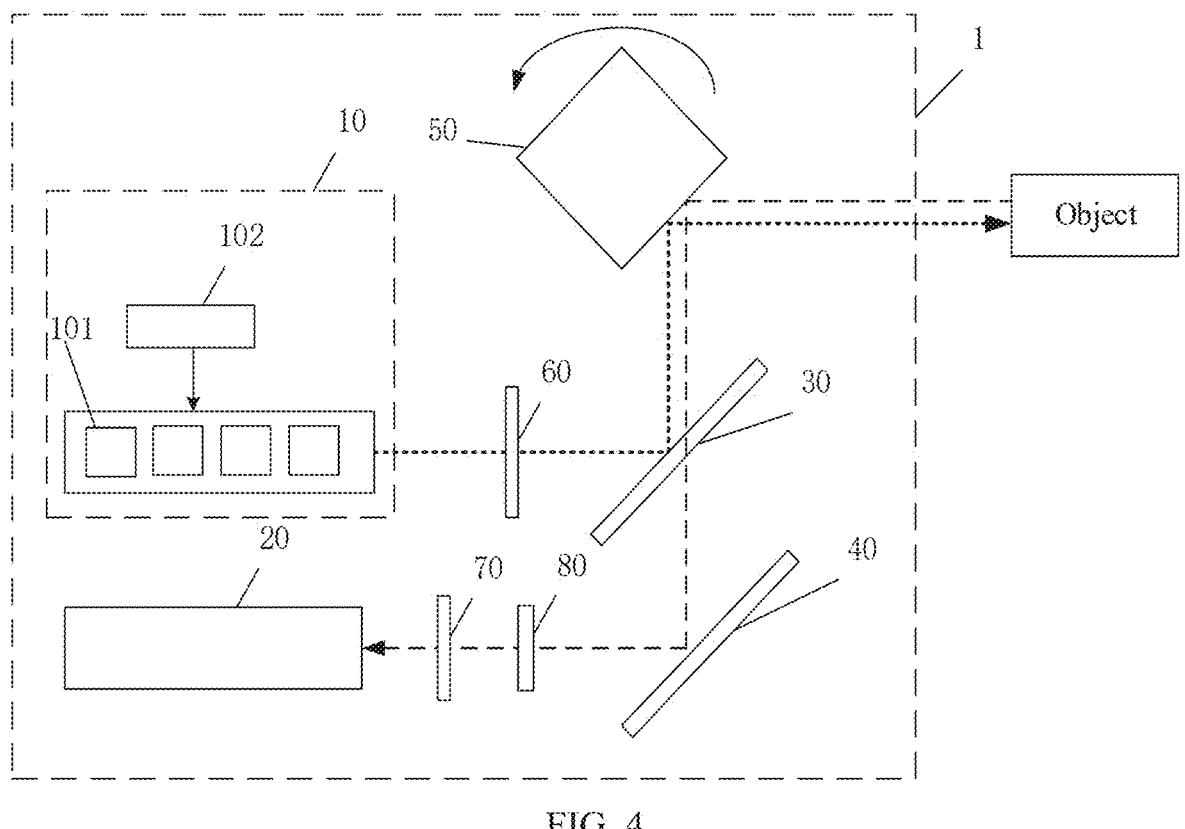
FIG. 4 is a third structural schematic diagram of the hybrid solid-state lidar with an increased signal dynamic range according to an embodiment of the present disclosure.

In this embodiment, the hybrid solid-state lidar 1 includes multiple emission cycles in a single measurement. Within each emission cycle, each of M power-and-pulse-width-adjustable VCSELs 101 emits Y detection laser beams, where $M \leq N$, M and N are positive integers, and N>1. It can be understood that the laser transmitter unit 10 performs time-multiplexed activation on the VCSELs 101. During each activation, the laser transmitter unit activates any one or multiple VCSELs 101 from the N VCSELs 101. As shown in FIG. 4, the time-multiplexed activation control is implemented via a control circuit 102 integrated in the laser transmitter unit 10, such as a multi-channel gating signal-based circuit. To achieve complete transmitting FoV tiling, the total number of VCSELs 101 emitting detection laser beams across all emission cycles must equal the total number of VCSELs 101 in the laser transmitter unit 10. For example, if a single measurement includes three emission cycles with the number of activated VCSELs 101 in each emission cycle being $M_1$, $M_2$, and $M_3$ respectively, then $M_1+M_2+M_3=N$. If only one VCSEL 101 is activated to emit Y detection laser beams within each emission cycle, there are N emission cycles included in a single measurement. That is, if a single measurement includes S emission cycles with the number of activated VCSELs 101 in each emission cycle being $M_i$, then $\Sigma_{i=1}^{s}M_i=N$.

The number Y of the detection laser beams emitted within each emission cycle is determined by solving a lidar equation for a preset lidar detection condition. For example, for single-photon-level SPADs featuring a photon detection efficiency of 40% @905 nm (40% photon detection efficiency at 905 nm wavelength), a false alarm rate of 1%, and a detection probability of 90%, a single measurement requires a signal-to-noise ratio (SNR) of 23. Considering dark counts and other noise effects, each detection requires the accumulation of 30 photons. Under the detection condition of 200 m@10% @100 kLux (200 m distance, 10% reflectivity, 100 kLux ambient light), solving the lidar equation determines that a 120 W/10 ns laser must cover 32 pixels with at least 3 accumulation cycles to meet the lidar detection condition. The required accumulation cycles may vary depending on specific lidar detection requirements. As the lidar equation is a normal equation, its computational steps are not redundantly described herein.

Meanwhile, to increase the signal dynamic range in a single TCSPC process and solve the short-range reflectivity signal loss problem in long-range ranging, multiple emission parameter ranges are preset in this embodiment. Each emission parameter range defines limits for the power and pulse width of the detection laser beams emitted by the VCSELs 101, including a low-power short-pulse-width range, a high-power short-pulse-width range, and a high-power long-pulse-width range. Optionally, the low-power short-pulse-width range corresponds to a power falling within [5 W, 25 W] and a pulse width falling within [1 ns, 3 ns], the high-power short-pulse-width range corresponds to a power falling within [60 W, 180 W] and a pulse width falling within [1 ns, 3 ns], and the high-power long-pulse-width range corresponds to a power falling within [60 W, 180 W] and a pulse width falling within [9 ns, 11 ns]. Among the Y detection laser beams emitted within each emission cycle, at least one detection laser beam is emitted with the parameters selected from the low-power short-pulse-width range, at least one detection laser beam is emitted with the parameters selected from the high-power short-pulse-width range, and at least one detection laser beam is emitted with the parameters selected from the high-power long-pulse-width range. Therefore, Y cannot be less than 3. Considering both the accumulation cycle requirement and the emission parameter range requirement for lidar detection, Y must be greater than or equal to 3 in this embodiment.

The above analysis shows that when all the VCSELs 101 are activated (i.e., M=N), the high reflectivity from a short-range object will cause the photon count received by the SPADs to exceed limits. However, when M is excessively large (i.e., M>N/2), if the M VCSELs 101 simultaneously emit detection laser beams, the echo signals may overlap at the laser receiver unit 20 due to lens distortion or scattering, thereby inducing signal interference between SPADs pixels. Thus, in a preferred embodiment, the number of activated lasers within each emission cycle is set to be not greater than half the total number of the VCSELs 101 in the laser transmitter unit 10 (i.e., M≤N/2).

Taking Y=5 as an example, the laser transmitter unit 10 emits five detection laser beams within each emission cycle.

Figure 5:
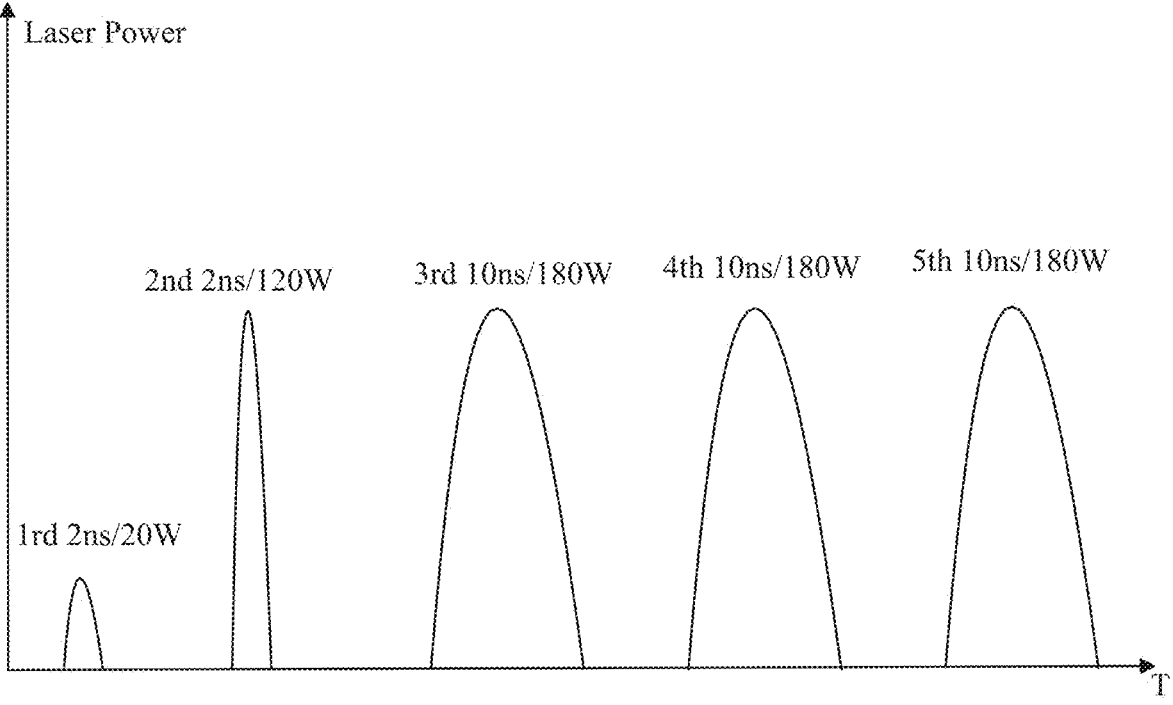
FIG. 5 is a schematic diagram of multiple detection laser beams emitted in a single measurement according to an embodiment of the present disclosure.

To satisfy the requirements for the emission parameter ranges, referring to FIG. 5, the first emission selects (20 W peak power, 2 ns pulse width) from the low-power short-pulse-width range as the emission parameters for the VCSELs 101. The second emission selects (120 W peak power, 2 ns pulse width) from the high-power short-pulse-width range as the emission parameters for the VCSELs 101. The third, fourth, and fifth emissions all emit (180 W peak power, 10 ns pulse width) detection laser beams, that is, they select the emission parameters from the high-power long-pulse-width range.

Figure 6:
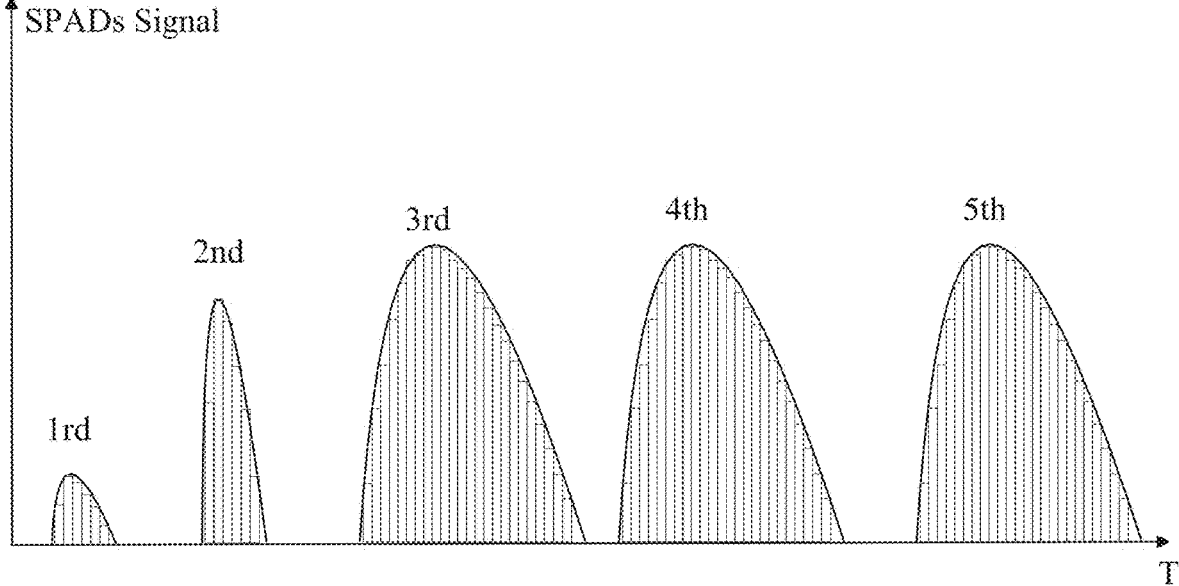
FIG. 6 is a schematic diagram showing responses of a laser receiver unit to echo signals corresponding to the detection laser beams shown in FIG. 5 according to an embodiment of the present disclosure.

There are time intervals between successive emissions from the VCSELs 101, with the pulse emission intervals ranging from 1 us to 3 μs. The SPADs in the laser receiver unit 20 are nonlinear devices with a dead time. After responding to an echo signal, the SPADs remain unresponsive to other echo signals during their dead time. The SPADs exhibit distinct responses to signals of varying pulse widths and powers. If SPADs operate in a linear region for every echo, the signal rising edge of the SPADs is approximately equal to the pulse width of the emitted laser beam, while the signal falling edge of the SPADs is approximately equal to the cumulative dead time of all the activated SPADs. After each laser emission, the number of photons received by each pixel of the SPADs is counted and the results are recorded in a memory cell for cumulative summation. As an example, the statistical results of the SPADs photon counts corresponding to the above five emissions with different pulse widths and powers are shown in FIG. 6.

Figure 7:
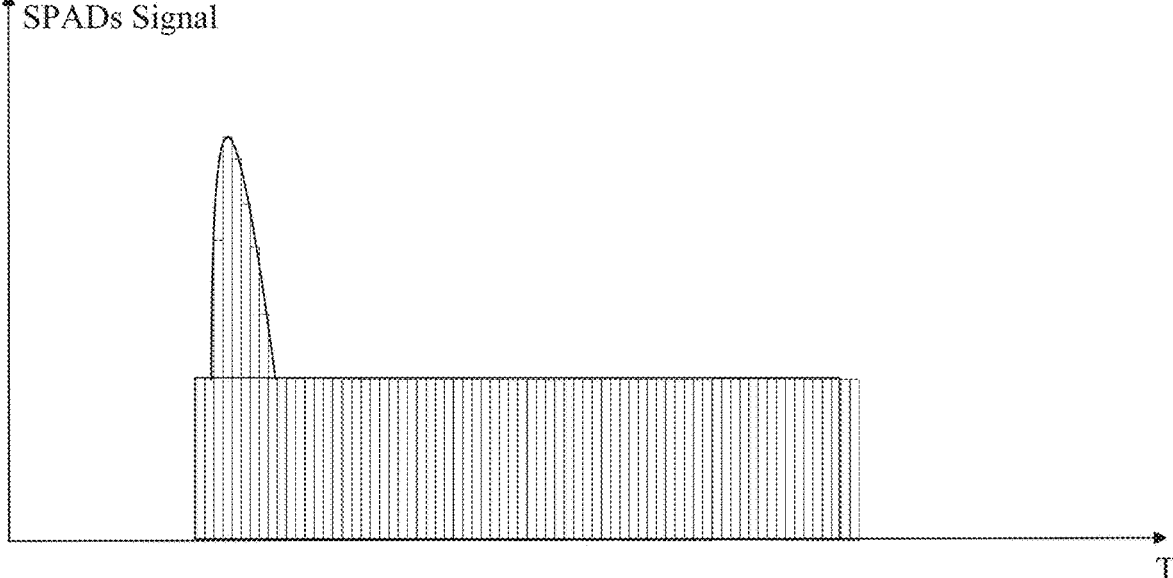
FIG. 7 is a schematic diagram showing responses of the laser receiver unit to echo signals in short-range ranging according to an embodiment of the present disclosure.
Figure 8:
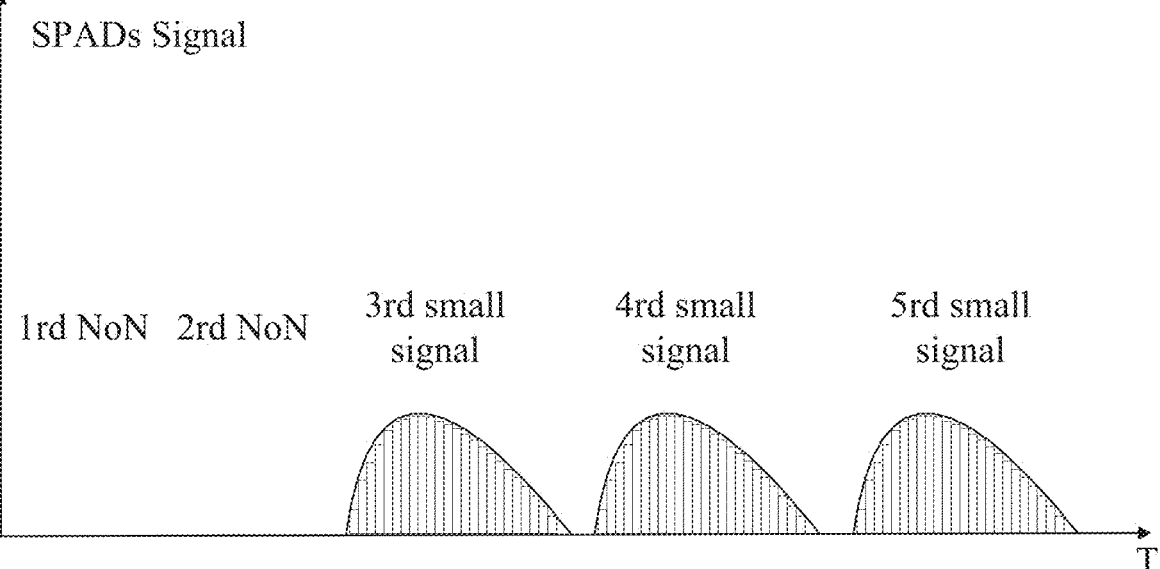
FIG. 8 is a schematic diagram showing responses of the laser receiver unit to echo signals in long-range ranging according to an embodiment of the present disclosure.

Assuming the object is at a short range (e.g., about 5 m), the low-power short-pulse-pulse detection laser beam of the first emission generates an echo signal, while the detection laser beams of the second to fifth emissions become saturated, approximating a rectangular histogram. After correlated accumulation of pulses in a single measurement, the echo signals received by the SPADs are shown in FIG. 7. The ToF is determined based on the peak of the echo signal, thereby enabling distance calculation. There is a linear region at the top of the echo signals, which indicates linear energy echoes. If the object is at a long range (e.g., about 100 m), the detection laser beams of the first and second emissions (with insufficient pulse widths and powers) will fail to produce detectable echoes for the SPADs. Only emissions with a 180 W peak power and 10 ns pulse width can generate an echo signal, as shown in FIG. 8. As shown in the figure, the third, fourth, and fifth emissions yield small echo signals (small signals), which also exhibit a linear relationship in the echo signals received by the SPADs. Thus, distance measurement can be achieved via echo signals, and reflectivity information can be inferred from pulse width information.

In this embodiment, by adjusting the emission power and pulse width for each emission of the lidar pulse, the signal dynamic range is increased within a single TCSPC process, ensuring linear energy echoes across the full dynamic range. Linear energy echoes represent the intensity of echo signals. Since lidar reflectivity is proportional to echo power, linear energy echoes directly correlate with lidar reflectivity. Consequently, short-range reflectivity signals can be derived from pulse width data in the linear region. The SPADs-based lidar provided by the present disclosure solves the reflectivity signal loss problem of conventional SPADs-based lidars during short-range ranging, and achieve high accuracy for both short- and long-range ranging.

In a preferred embodiment, to further improve the measurement precision of the lidar, the laser transmitter unit 10 adjusts the powers and pulse widths of detection laser beams at each emission based on a tiered gain during a single measurement. Specifically, the measurements within a single ranging process are categorized into initial and non-initial measurements based on measurement sequence. During an initial measurement, multiple laser emissions are performed with the emission parameter ranges described in the above embodiment. The SPADs perform an initial calculation based on the response waveform of the echo signal to estimate an initial ranging distance to the object. Although the accuracy of this ranging distance is limited, it enables distinguishing whether the object is within a long or short-range (e.g., classified as long-range or short-range). Based on the initial ranging distance, in subsequent non-initial measurements, the parameters of the detection laser beams emitted in each emission cycle are determined based on the preset tiered gain. The tiered gain is a preset correspondence between the emission power/pulse width of the VCSEL and the ranging distance: the powers and pulse widths of the VCSELs are divided into S tiers, with each tier corresponding to different powers and pulse widths.

Taking S=3 as an example, the S tiers are divided into a short-range tier (e.g., 0-20 m), a medium-range tier (e.g., 20-50 m), and a long-range tier (e.g., >50 m). The short-range tier uses a low power (e.g., 10 W) and a short pulse width (e.g., 2 ns) to suppress a signal overload. The medium-range tier uses a medium power (e.g., 30 W) and a medium pulse width (e.g., 8 ns) to balance the signal intensity and noise. The long-range tier uses a high power (e.g., 100 W) and a long pulse width (e.g., 10 ns) to enhance detection capability. According to the ranging distance obtained from the initial measurement, the emission power and pulse width for a subsequent measurement are determined based on the tiered gain. During a non-initial measurement, the detection laser beams are emitted with fixed power and pulse width based on the tiered gain across multiple emissions. This strategy ensures stable echo signals and achieves high-precision measurements.

The hybrid solid-state lidar provided by the present disclosure designs the number of emissions, emission power, and emission pulse width in a single measurement. Based on this, when the SPADs superimpose echo signals from multiple measurements, high-precision ranging of the lidar is achieved using the conventional TCSPC method. It should be noted that in the present disclosure, the number of emissions and the emission power and pulse width within a single measurement are flexibly configurable based on the lidar's ranging requirement, detection condition, and application scenario. The above embodiment serves as a preferred embodiment rather than a definitive limitation.

This embodiment provides a hybrid solid-state lidar with an enhanced signal dynamic range. Building on the conventional SPADs-based lidar architecture, the present disclosure dynamically adjusts the emission parameters within a single ranging cycle to expand the signal dynamic range during a TCSPC process. The present disclosure suppresses short-range saturation while improving long-range sensitivity, without increasing hardware complexity or accumulation cycles. The present disclosure ensures linear energy echoes across the full dynamic range for the SPADs-based lidar, solving the short-range reflectivity signal loss problem caused by fixed parameters in conventional SPADs-based lidars. Thus, the SPADs-based lidar of the present disclosure maintains high accuracy for both long-and short-range ranging, offering a novel technical approach for reliable perception in complex scenarios.

Referring to FIG. 9, under the same inventive concept, a second embodiment of the present disclosure proposes a control method for a hybrid solid-state lidar with an enhanced signal dynamic range. Optionally, the control method is used to control the hybrid solid-state lidar with an enhanced signal dynamic range described in the above embodiment, and includes steps S10 to S30.

S10. The laser transmitter unit performs at least one emission cycle during a single measurement. Within each emission cycle, each of M power-and-pulse-width-adjustable VCSELs emits Y detection laser beams. The laser transmitter unit includes N power-and-pulse-width-adjustable VCSELs, where N>1, MSN, M is a positive integer, and Y≥3. A total number of VCSELs emitting detection laser beams across cumulative emission cycles is equal to N. Among the Y detection laser beams emitted within each emission cycle, at least one detection laser beam is emitted with parameters selected from the low-power short-pulse-width range, at least one detection laser beam is emitted with parameters selected from the high-power short-pulse-width range, and at least one detection laser beam is emitted with parameters selected from the high-power long-pulse-width range.

S20. The detection laser beams are reflected by the transmitting mirror to the rotating polygon mirror, and the rotating polygon mirror reflects the detection laser beams to form detection scanning beams.

S30. The rotating polygon mirror receives echo signals generated when the detection scanning beams scan the object, and reflects the echo signals to the receiving mirror; and the receiving mirror reflects the echo signals to the laser receiver unit, thereby completing a single measurement.

In a preferred embodiment, the control method further includes following steps.

A measurement sequence type of the single measurement is determined, where the measurement sequence type includes an initial measurement and a non-initial measurement.

In response to that the measurement sequence type is determined as the initial measurement, among the Y detection laser beams emitted within each emission cycle, at least one detection laser beam is emitted with parameters selected from the low-power short-pulse-width range, at least one detection laser beam is emitted with parameters selected from the high-power short-pulse-width range, and at least one detection laser beam is emitted with parameters selected from the high-power long-pulse-width range.

In response to that the measurement sequence type is determined as the non-initial measurement, emission parameters for the Y detection laser beams emitted within each emission cycle are determined based on a preset tiered gain. The tiered gain defines a correspondence between emission parameters of a VCSEL and a ranging distance. The ranging distance is calculated by the laser receiver unit based on echo signals from an initial measurement.

The technical features and effects of the control method for a hybrid solid-state lidar with an enhanced signal dynamic range proposed in the embodiment of the present disclosure are identical to those of the hybrid solid-state lidar in the above embodiment of the present disclosure and will not be reiterated herein.

To sum up, the embodiments of the present disclosure propose a hybrid solid-state lidar with an increased signal dynamic range and a control method. The hybrid solid-state lidar includes a laser transmitter unit, a laser receiver unit, a transmitting mirror, a receiving mirror, and a rotating polygon mirror. The laser transmitter unit includes N power-and-pulse-width-adjustable VCSELs, and the laser receiver unit adopts a SPADs array sensor. The laser transmitter unit and the transmitting mirror are arranged at one side of the rotating polygon mirror and form a laser outgoing optical path structure with the rotating polygon mirror. The laser receiver unit and the receiving mirror are also arranged at the one side of the rotating polygon mirror. The laser receiver unit, the receiving mirror, and the rotating polygon mirror form a laser incoming optical path structure. The laser transmitter unit performs at least one emission cycle during a single measurement. Within each emission cycle, each of M power-and-pulse-width-adjustable VCSELs emits Y detection laser beams, where N>1, M≤N, M is a positive integer, and Y≥3. A total number of VCSELs emitting detection laser beams across cumulative emission cycles is equal to N. Among the Y detection laser beams emitted within each emission cycle, at least one detection laser beam is emitted with parameters selected from a low-power short-pulse-width range, at least one detection laser beam is emitted with parameters selected from a high-power short-pulse-width range, and at least one detection laser beam is emitted with parameters selected from a high-power long-pulse-width range. Based on the conventional SPADs-based hybrid solid-state lidar architecture, the present disclosure dynamically adjusts the emission parameters within a single ranging cycle to expand the signal dynamic range during a TCSPC process. The present disclosure suppresses short-range saturation while improving long-range sensitivity, without increasing hardware complexity or accumulation cycles. The present disclosure ensures linear energy echoes across the full dynamic range for the SPADs-based lidar, solving the short-range reflectivity signal loss problem caused by fixed parameters in conventional SPADs-based lidars. Thus, the SPADs-based lidar of the present disclosure maintains high accuracy for both long-and short-range ranging, offering a novel technical approach for reliable perception in complex scenarios.

The embodiments in this specification are described in a progressive manner. For same or similar parts between embodiments, reference may be made to each other. Each embodiment focuses on a difference from other embodiments. For a system embodiment, since it is basically similar to the method embodiment, the description is relatively simple, and reference can be made to the description of the method embodiment. It should be noted that the technical characteristics of the above embodiments can be employed in arbitrary combinations. To provide a concise description of these embodiments, all possible combinations of all the technical characteristics of the above embodiments may not be described. However, these combinations of the technical characteristics should be construed as falling within the scope defined by the specification as long as no contradiction occurs.

Only several preferred implementations of the present disclosure are described in detail in the above embodiments, but they should not therefore be construed as limiting the scope of the present disclosure. It should be noted that several improvements and replacements may further be made by those of ordinary skill in the art without departing from the technical principle of the present disclosure, and such improvements and replacements should also be deemed as falling within the protection scope of the present disclosure. Therefore, the protection scope of the present disclosure should be subject to the protection scope of the claims.

The invention claimed is:

1. A hybrid solid-state lidar with an increased signal dynamic range, comprising:

a laser transmitter unit, a laser receiver unit, a transmitting mirror, a receiving mirror, and a rotating polygon mirror, wherein the laser transmitter unit comprises N power-and-pulse-width-adjustable vertical cavity surface emitting lasers (VCSELs), and the laser receiver unit adopts a single photon avalanche diodes (SPADs) array sensor;

the laser transmitter unit and the transmitting mirror are arranged at one side of the rotating polygon mirror and form a laser outgoing optical path structure with the rotating polygon mirror; the laser receiver unit and the receiving mirror are also arranged at the one side of the rotating polygon mirror; and the laser receiver unit, the receiving mirror, and the rotating polygon mirror form a laser incoming optical path structure;

the laser transmitter unit performs at least one emission cycle during a single measurement; within each emission cycle, each of M power-and-pulse-width-adjustable VCSELs selected from the N power-and-pulse-width-adjustable VCSELs is activated to emit, based on an emission time interval, Y laser beams for detection, wherein N>1, M≤N, M is a positive integer, and Y>3; and a total number of VCSELs emitting laser beams for detection across all emission cycles cumulatively in the single measurement is equal to N; and wherein a measurement sequence type of the single measurement comprises an initial measurement and a non-initial measurement;

in response to that the measurement sequence type is determined as the initial measurement, among the Y laser beams for detection emitted within each emission cycle, at least one laser beam for detection is emitted with parameters selected from a low-power short-pulse-width range, at least one laser beam for detection is emitted with parameters selected from a high-power short-pulse-width range, and at least one laser beam for detection is emitted with parameters selected from a high-power long-pulse-width range; and in response to that the measurement sequence type is determined as the non-initial measurement, the parameters for the Y laser beams for detection emitted within each emission cycle are determined based on a preset tiered gain; the tiered gain defines a correspondence between emission parameters of a VCSEL and a ranging distance; and the ranging distance is calculated by the laser receiver unit based on echo signals from the initial measurement.

2. The hybrid solid-state lidar with an increased signal dynamic range according to claim 1, wherein the N VCSELs are arranged in a vertical linear array.

3. The hybrid solid-state lidar with an increased signal dynamic range according to claim 1, wherein the rotating polygon mirror comprises multiple reflective surfaces arranged in equal divisions around a circumcircle defined by a cross-section of the rotating polygon mirror.

4. The hybrid solid-state lidar with an increased signal dynamic range according to claim 1, wherein a value of the N is determined based on a preset number of lines of the hybrid solid-state lidar and a pixel count of the laser receiver unit covered by the VCSELs; and the preset number of lines of the hybrid solid-state lidar is determined by a pixel count of the laser receiver unit.

5. The hybrid solid-state lidar with an increased signal dynamic range according to claim 1, wherein MSN/2.

6. The hybrid solid-state lidar with an increased signal dynamic range according to claim 1, wherein a value of the Y is the number of accumulation cycles required for the hybrid solid-state lidar to meet a preset lidar detection condition and is solved by a lidar equation; and the preset lidar detection condition comprises a detection distance value, a reflectivity value, and an ambient light value.

7. The hybrid solid-state lidar with an increased signal dynamic range according to claim 1, wherein a transmitting focusing and collimating unit is disposed between the laser transmitter unit and the transmitting mirror; and a receiving focusing and collimating unit and a filter unit are sequentially disposed between the laser receiver unit and the receiving mirror.

8. A control method for a hybrid solid-state lidar with an increased signal dynamic range, comprising:

performing, by a laser transmitter unit, at least one emission cycle during a single measurement, wherein within each emission cycle, each of M power-and-pulse-width-adjustable VCSELs selected from the N power-and-pulse-width-adjustable VCSELs is activated to emits, based on an emission time interval, Y laser beams for detection;

the laser transmitter unit comprises N power-and-pulse-width-adjustable VCSELs, wherein N>1, M≤N, M is a positive integer, and Y>3; a total number of VCSELs emitting detection laser beams for detection across all emission cycles cumulatively in the single measurement is equal to N; and among the Y laser beams for detection emitted within each emission cycle, at least one laser beam for detection is emitted with parameters selected from a low-power short-pulse-width range, at least one laser beam for detection is emitted with parameters selected from a high-power short-pulse-width range, and at least one laser beam for detection is emitted with parameters selected from a high-power long-pulse-width range;

reflecting, by a transmitting mirror, the laser beams for detection to a rotating polygon mirror; and reflecting, by the rotating polygon mirror, the laser beams for detection to form detection scanning beams; and receiving, by the rotating polygon mirror, echo signals generated when the detection scanning beams scan an object; reflecting the echo signals to a receiving mirror; and reflecting, by the receiving mirror, the echo signals to a laser receiver unit, thereby completing a single measurement;

wherein the control method further comprises:

determining a measurement sequence type of the single measurement, wherein the measurement sequence type comprises an initial measurement and a non-initial measurement;

in response to that the measurement sequence type is determined as the initial measurement, among the Y laser beams for detection emitted within each emission cycle, at least one laser beam for detection is emitted with parameters selected from the low-power short-pulse-width range, at least one laser beam for detection is emitted with parameters selected from the high-power short-pulse-width range, and at least one laser beam for detection is emitted with parameters selected from the high-power long-pulse-width range; and in response to that the measurement sequence type is determined as the non-initial measurement, the parameters for the Y laser beams for detection emitted within each emission cycle are determined based on a preset tiered gain; the tiered gain defines a correspondence between emission parameters of a VCSEL and a ranging distance; and the ranging distance is calculated by the laser receiver unit based on echo signals from the initial measurement.

*　*　*　*　*